United States Patent Office 2,941,053
Patented June 14, 1960

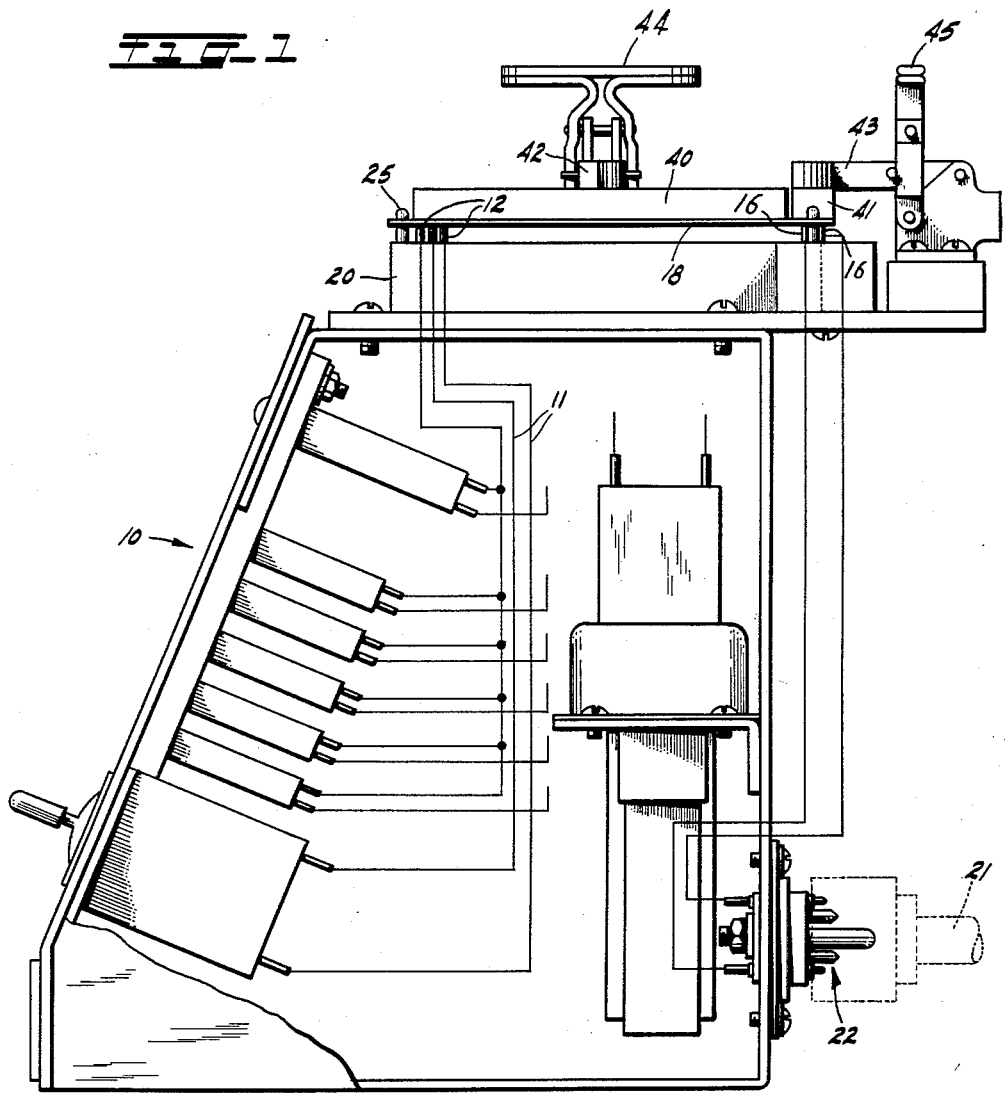
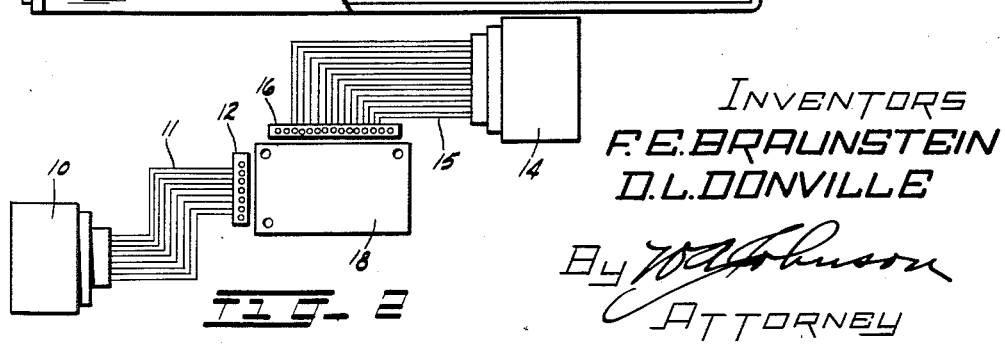

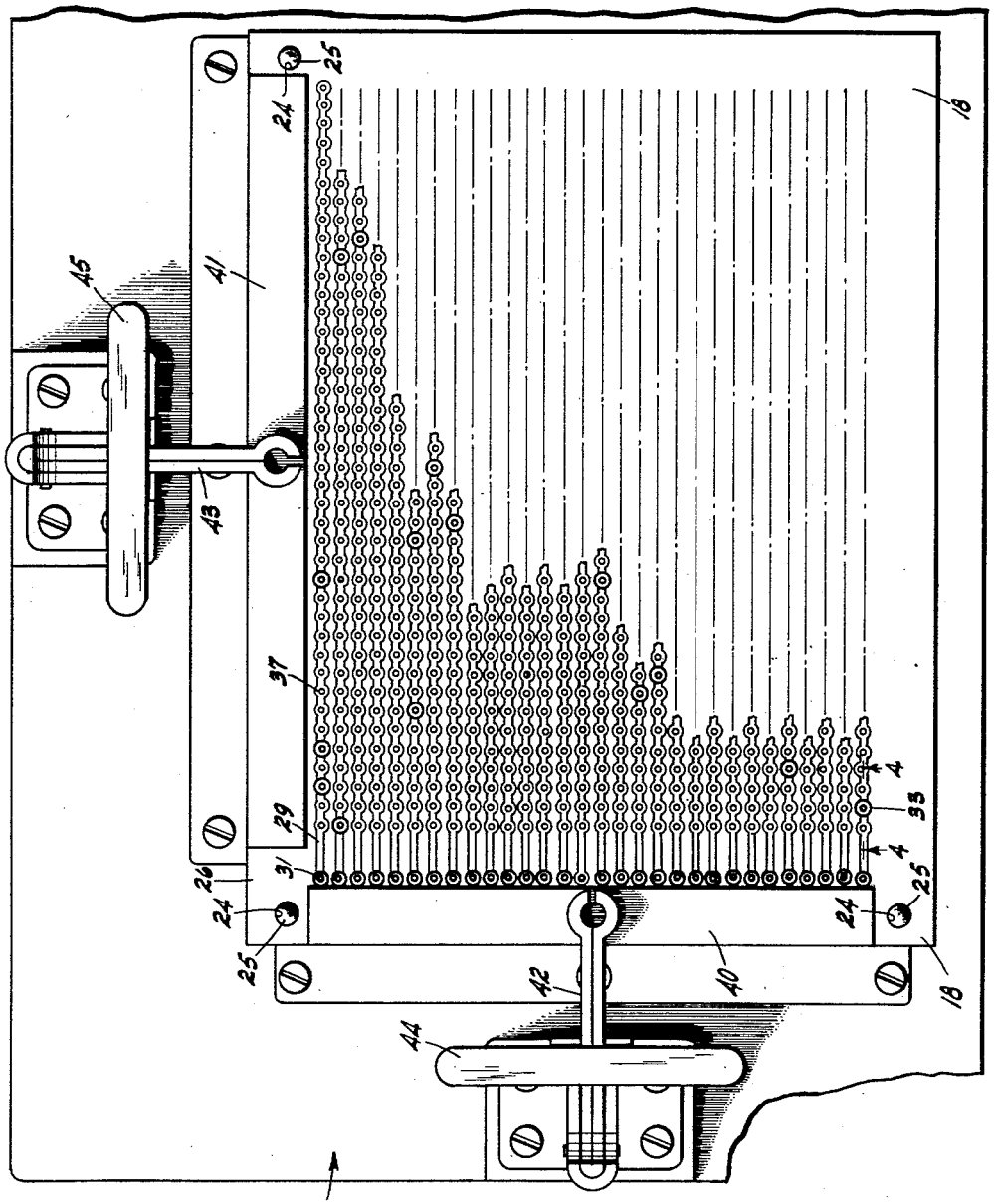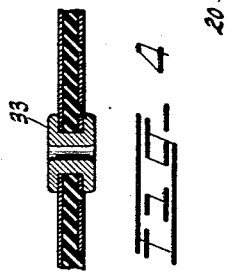

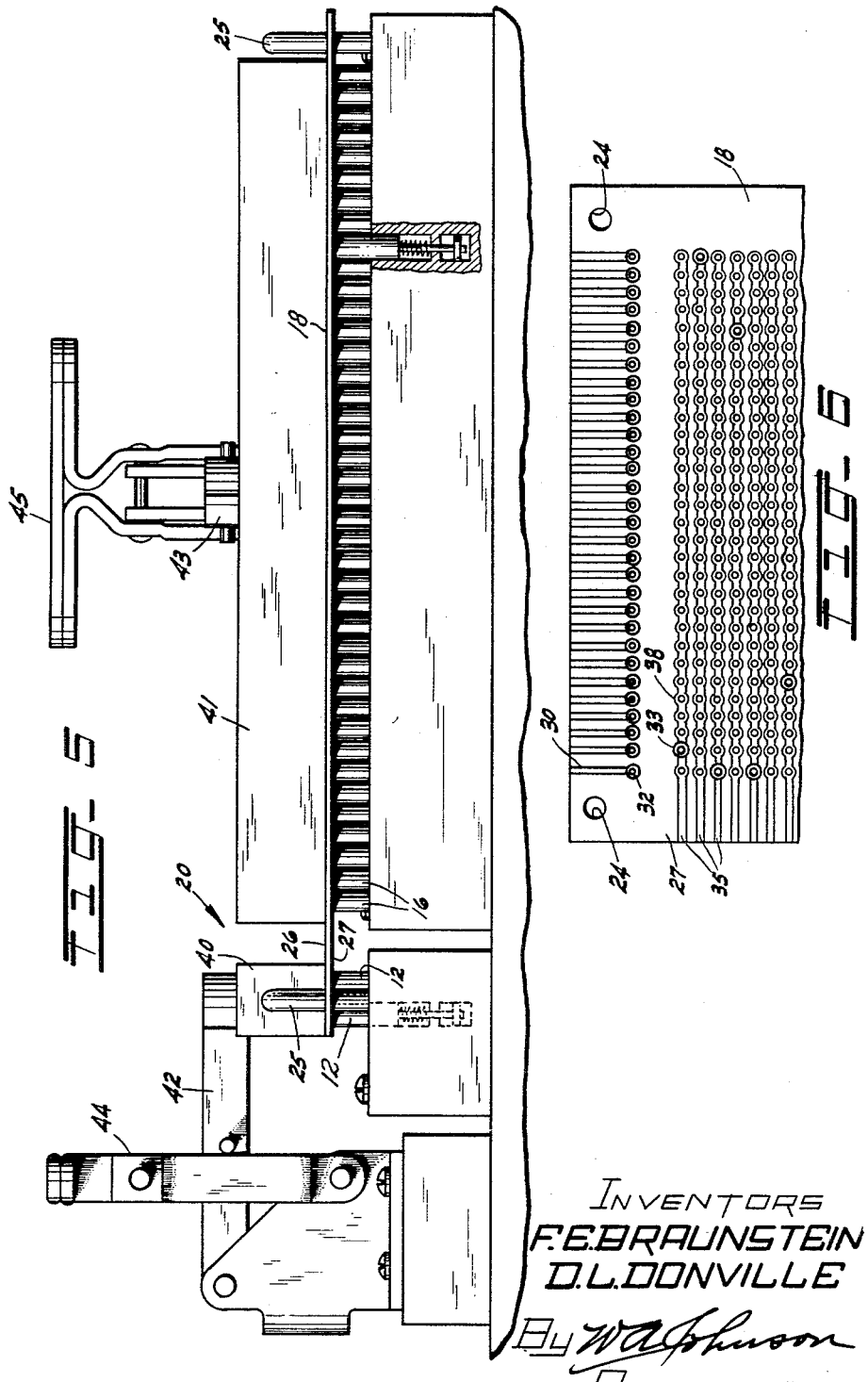

2,941,053
TESTING APPARATUS

Frank E. Braunstein, Ridgewood, N.J., and David L. Donville, Seaford, N.Y., assignors to Western Electric Company, Incorporated, New York, N.Y., a corporation of New York Filed Nov. 7, 1957, Ser. No. 695,125

2 Claims. (Cl. 200—46)

This invention relates to testing and particularly to facilities for connecting test apparatus to electrical units to be tested.

Electrical equipment, such as telephone exchange equipment, includes many apparatus units which are generally similar but which may have any one of a number of somewhat different electric circuits. These different circuits are often sufficiently alike that they can be tested on the same test set if the proper electrical connections are made between the unit and the test set in each case. In testing such units the time required to make and check the necessary connections for each unit is considerable and may even exceed the time needed to make the actual test.

The object of this invention is to reduce the time and care required to make the necessary connections between test equipment and the apparatus to be tested.

According to the invention, a contact fixture adapted to be interposed between a test set and the units to be tested has two sets of terminals and cables extending therefrom, one to the test set and another to the terminals of the apparatus under test. The necessary circuits between the unit under test and the test equipment are completed by means of circuit arranging cards which may be clamped in the fixture. A separate card is made up for each desired circuit pattern so that it is only necessary to plug the cable into the unit under test and then insert the proper card in the fixture. Any number of identical units may then be tested in quick succession merely by plugging the cable from the fixture into the units successively and when a series of slightly different units is to be tested it is only necessary to substitute the proper card in the fixture and proceed as before.

In the present instance the circuit arranging card is used in combination with a test set, and a fixture with two series of spaced contacts with conductors respectively connecting one series of contacts to the test set and the other series of contacts to units of apparatus to be tested, of a circuit arranging card having a wiring pattern thereon for selectively interconnecting the conductors between the test sets and the units. In the present instance, each circuit arranging card is formed of dielectirc material with a large number of conductive strips extending parallel in one direction from one edge of the card and another series of conductive strips mounted on the opposing surface of the card extending transversely over the other conductive strips and extending from another edge of the card. With clamps adapted to cause engagement of each conductive strip with its respective terminal of the fixture and conductive rivet-like members extending through the dielectric card to connect any selected pair of conductive strips, it is possible to repeatedly complete circuits between selected terminals of the fixture or between a testing apparatus and units of an apparatus to be tested.

Other objects and advantages will be apparent from the following detailed description when considered in conjunction with the accompanying drawings wherein:

Fig. 1 is a vertical sectional view of a test set with a fixture mounted thereon for receiving any selected one of the circuit arranging cards;

Fig. 2 is a schematic illustration of the connection of a test set to an apparatus to be tested through the introduction of a circuit arranging card;

Fig. 3 is a top plan view of one of the cards mounted in the fixture;

Fig. 4 is an enlarged fragmentary sectional view taken along the line 4—4 of Fig. 3;

Fig. 5 is a front elevational view of the fixture with a card mounted therein, and Fig. 6 is a fragmentary bottom plan view of one of the cards.

Referring now to the drawings, attention is directed to Fig. 2 which represents a test set 10 with conductors 11 grouped in the form of a cable extending to one set of terminals 12. An apparatus or a plurality of units to be tested in an apparatus indicated at 14 is illustrated as having connections through conductors 15 with terminals 16. In telephone equipment testing the connections between the apparatus 14 and the terminal strip 16 may be made with the conductors 15 connected to conventional jack or contact strips to electrically connect all of the units to their respective terminal of the terminal strip 16. Depending upon the type of apparatus 14 and the varied tests to be performed thereon, the necessary connections between the apparatus 14 and the test set 10 may be made or set up for completion selectively at the test set through any one of a series of circuit arranging cards 18.

In the present instance a fixture 20 is mounted upon the test set 10 and includes two double zig-zag rows of spring pressed terminals 12 and 16. The terminals 12 and 16 are illustrated schematically in Fig. 2 in single rows but in reality they are in double zig-zag rows to permit close positioning of the terminals in each group. The terminals 12 in the present instance are thirty in number and are connected through the conductors 11 to various units of the test set as partially illustrated in Fig. 1. The units and switches of the test set are not described as they are not individual parts of the invention. It is important to understand that any test set capable of performing the desired tests may be employed and changed only in the connection of the wires 11 of the units of the test set to the terminals 12 of the fixture. The test set is provided with suitable electrical energy from a cable 21 through connections 22. The row of spring pressed terminals 16 are forty in number and are arranged through the conductors 15 for connection with the various units of the apparatus 14 to be tested.

The circuit arranging cards 18 are identical in size and structure up to a given point. The cards are all provided with three apertures 24 for receiving three locating pins 25 of the fixture 20. Furthermore, the cards are formed of dielectric material and are identical in size, providing opposing surfaces 26 and 27 surrounded by edges. On the top surface 26, thirty equally spaced conductive strips 29 are disposed in parallel positions upon or embedded in the surface, these conductive strips or elements extending from one edge of the card. The conductive elements 29 are spaced on a surface 26 to respectively engage their terminals 12. This arrangement cannot complete connection with the terminals 12 as the terminals will engage portions of the under surface 27. To bring about this connection, a series of short strips 30, Fig. 6, are mounted upon or embedded in the surface 27 directly beneath their respective strips or elements 29. Furthermore, enlarged circular portions 31 of the elements 29 and circular portions 32 of the short strips 30 are aligned with each other for electrical connections through the aid of connectors 33, Fig. 4. The connectors 33 are in the form of a hollow metallic rivet placed in apertures extending centrally through the portions 31 and 32 to make connections electrically between the elements 29 and the shorter strips 30. The terminals 12, engaging the conductive strips 30, will be included in circuits with their respective conductive elements 29.

The under surface 27 of each card is provided with parallel conductive elements 35 extending from another edge across the card and spaced to engage their respective terminals 16 when the card is placed in the fixture over the locating pins 25. With the arrangement of conductive elements 29 and 35, it will be apparent that each conductive element of each group traverses each conductive element of the other group. The conductive elements 29 and 35 are provided with enlarged circular portions 37 and 38 at the positions where they cross their opposing conductive elements so that at any of these crossings a connector 33 may be mounted to electrically connect the selected conductive elements of each group to complete pre-selected circuits connecting the units of the apparatus 14 with predetermined testing equipment in the test set 10.

The fixture 20 is provided with pressure blocks 40 and 41 for engaging the selected circuit arranging card 18 and forcing the adjacent portions thereof downwardly against the series of terminals 12 and 16 to form connections between the terminals 12—16 and their respective conductive elements 29—35 of the card. The pressure blocks 40 and 41 are formed preferably of dielectric material and are supported by arms 42 and 43 of clamping units 44 and 45 which may be actuated readily to move the blocks into and out of clamping positions.

By forming the circuit arranging cards identical in every detail with the exception of the positions of the connectors 33 to connect predetermined conductive elements 29 with predetermined conductive elements 35, the cards may be stored in a compact space and identified, by suitable means not shown, for the completion of certain tests on certain types of equipment. Therefore, after plugging in the apparatus 14 to its series of terminals 16, the test set 10 remaining connected to its terminals 12, the card for the particular apparatus being tested may be inserted readily in the fixture with the clamps 44 and 45 open to allow the locating apertures 24 to center over their guide pins 25 and the card 18 to come to rest on the terminals 12 and 16. The clamps 44 and 45 may be closed, applying like pressures on their respective portions of the card to compress the spring pressed terminals 12 and 16 to complete in this short interval of time all of the circuits necessary for the performance of the tests through the test set 10 and the apparatus 14. In other words, the card, when clamped in the fixture, completes a preselected series of circuits between the terminals 12 and the terminals 16. When these tests have been performed, the clamps 44 and 45 may be opened, the card removed and another card selected for the next apparatus or group of units to be tested. If a plurality of like units or apparatus are to be tested successively, then the same card may be employed until the completion of these tests, after which a new card for a new series of tests may be selected, inserted in the fixture rapidly and the new circuits arranged for the new tests.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. The combination with a test set to electrically test units of apparatus, of a fixture having two series of spring-pressed contacts positioned at substantially right angles with respect to each other and having upper surfaces lying in a given plane, two sets of conductors respectively connecting one series of contacts to the test set and the other series of contacts to units of apparatus to be tested, a circuit arranging patch card formed of dielectric material and having top and bottom surfaces surrounded by alternatively positioned end and side edges, a wiring pattern including a first series of conductive elements disposed in parallel positions on the bottom surface of the patch card and extending to a first side edge of the patch card to respectively rest upon and electrically engage the upper surfaces of one of the series of spring-pressed contacts, a second series of conductive elements disposed on the top surface of the patch card short of the edges thereof and positioned so that each element of the second series of conductive elements will traverse each element of the first series of conductive elements, a third series of conductive elements mounted on the bottom surface of the patch card in parallel positions adjacent a first end edge thereof to respectively rest upon and electrically engage the upper surfaces of the other series of spring-pressed contacts, connectors mounted in apertures of the patch card to respectively electrically connect the third series of conductive elements with the second series of conductive elements, conductive members extending through the dielectric material of the card at any position where the conductive elements of the second series traverse the conductive elements of the first series, means to key the patch card to the fixture to cause the conductive elements of the first and third series thereof to respectively rest on the upper surfaces of their respective series of spring-pressed contacts, and a clamp for each series of spring contacts actuable to engage the top surface of the patch card free of the second series of conductive elements and respectively force the first and third series of conductive elements against their spring-pressed contacts to uniformly compress the contacts and establish electrical connections between the wiring pattern and the contacts of the fixture.

2. The combination according to claim 1 in which enlarged circular conductive members are disposed in each of the first and second series of conductive elements at the traversing portions thereof so that any first conductive element may be electrically connected to any second conductive element by one of the conductive members extending through the card and any aligned pair of the circular members crimped to engage the circular members and thereby electrically connect the pair of circular members and their conductive elements.

References Cited in the file of this patent

UNITED STATES PATENTS

| | | |
|---|---|---|
| 2,041,589 | Bowers | May 19, 1936 |
| 2,613,287 | Geiger | Oct. 7, 1952 |
| 2,616,994 | Luhn | Nov. 4, 1952 |
| 2,712,309 | Offner | July 5, 1955 |
| 2,746,680 | Maul | May 22, 1956 |
| 2,870,400 | Hickok | Jan. 20, 1959 |